Patented Sept. 1, 1925.

1,551,605

UNITED STATES PATENT OFFICE.

PHILLIP WILLIAM NEVILL, OF EAST PERTH, WESTERN AUSTRALIA, AUSTRALIA, ASSIGNOR TO THE AUSTRALIAN MINERALS RECOVERY COMPANY LIMITED, OF PERTH, WESTERN AUSTRALIA, AUSTRALIA.

EXTRACTION AND RECOVERY OF COPPER FROM ITS ORES.

No Drawing. Application filed January 30, 1924. Serial No. 689,587.

*To all whom it may concern:*

Be it known that I, PHILLIP WILLIAM NEVILL, of East Perth, in the State of Western Australia, Commonwealth of Australia, have invented an Improvement in the Extraction and Recovery of Copper from Its Ores, of which the following description is a specification.

This invention relates to the extraction and recovery of copper from its ores.

The invention is of particular utility when used in conjunction with the metallic contact process forming the subject of Australian Letters Patent No. 19,100, dated the 13th December, 1920.

In the metallic contact process above referred to, a naturally or artificially oxidized copper ore in the form of a pulp is acted on by a metallic iron in the presence of a salt or salts whereby cement copper is liberated. The cement copper can then be separated either by elutriation or by the flotation process. It is obvious that by reason of the cement copper being in a relatively fine state of division, there will be some danger of a film of oxide forming on the surface, which will preclude oiling and therefore yield a product not amenable to flotation separation.

In addition, it has been found that if the flotation process is carried out using air as the froth basis, soluble iron salts are largely destroyed (particularly ferrous salts) and so are not available for treating a fresh charge of ore.

It has been further found when conducting flotation using air that a certain proportion of the copper is frequently rendered soluble, presumably by the solvent action of ferric salts that are formed. The copper rendered soluble is of course irrecoverable by flotation.

The object of the present invention is to conduct the process of flotation so that surface oxidation of cement copper is inhibited, whilst excessive destruction and oxidation of ferrous salts is prevented.

The invention consists broadly in passing a reducing gas or mixture of gases through and into the flotation circuit and also if desired through the pachuca in which the cement copper is set free by the operation of the metallic contact process.

To enable the nature of the invention to be more readily understood, reference will now be made to the accompanying examples.

*Example No. 1* (not according to this invention).—500 grams of ore (150 mesh) and containing 8.1% of copper was formed into a pulp with 1500 c.cs. of water, to which was added 50 grams each of ferrous sulphate and common salt, and also 40 grams of sponge iron (60% Fe.). After 10 minutes steam and air agitation in the pachuca, the mixture was agitated by air alone for a further 10 minutes, prior to which was added 10 drops of eucalyptus oil. The mixture was then transferred to and treated in a flotation machine which yielded a concentrate containing 80% of the copper contents of the ore. After treatment it was found that only 6 grams of soluble iron salts were left in the solution, whereas 50 grams were added.

*Example No. 2* (according to the invention).—500 grams of similar ore to that used in Example No. 1 was formed into a pulp with 1500 c.cs. of water, to which was added 15 grams of ferrous sulphate and 15 grams of salt, and 42 grams of sponge iron (60% Fe.). After steam and air agitation for 10 minutes, 10 drops of eucalyptus oil was added and air agitation given for 10 minutes. The mixture was then diluted with 1000 c.cs. of 2% salt solution and transferred to and treated in a flotation machine. During flotation coal gas was passed into the machine, so that such gas became the basis of the froth. A recovery of 83.8% of the copper was obtained, and the residual solution contained 3 grams of ferrous sulphate, so that there was a much smaller consumption than in Example No. 1.

*Example No. 3* (according to the invention).—500 grams of ore similar to that used in previous examples was formed into a pulp with 2500 c.cs. of water, 50 grams each of ferrous sulphate and salt added, and also 40 grams of iron (60% Fe.). After steam and air agitation for 10 minutes, 8 drops of eucalyptus oil was added and air agitation continued for 10 minutes. The product was transferred to and treated in a flotation machine at a temperature of 40° C., 5 drops more oil being added. The flotation was conducted whilst coal gas was being passed into the machine, and yielded a concentrate containing 83% of the copper contents of the ore. The residual solution contained 43 grams of ferrous sulphate.

It will be obvious that the invention is not limited to the use of coal gas as the froth basis, but that other reducing or similar functioning gases may be employed. Theoretically a perfectly neutral gas should be useful, but in practice it is necessary to have a gas in which there is sufficient of a reducing constituent to neutralize the oxidizing influence of gases that are also almost invariably present.

I claim:—

A process for the recovery of copper cement comprising forming a copper ore pulp containing ferrous salt and subjecting the pulp to flotation separation in the presence of reducing gas, said gas not only preventing oxidation of the copper cement but also preventing conversion of the ferrous salts into ferric salts.

Dated this 17th day of December, 1923.

PHILLIP WILLIAM NEVILL.